Dec. 2, 1930.  G. C. BUTCHER  1,783,699
POULTRY KILLER
Filed April 22, 1929
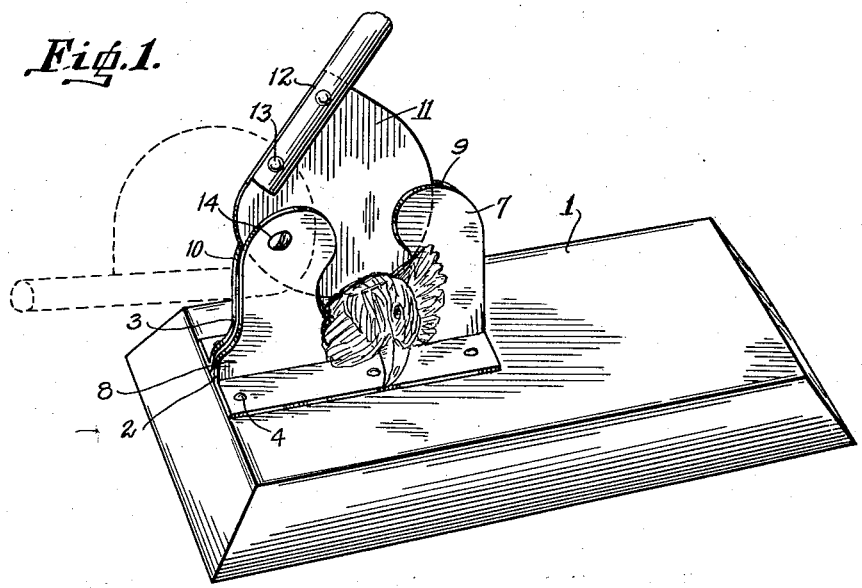
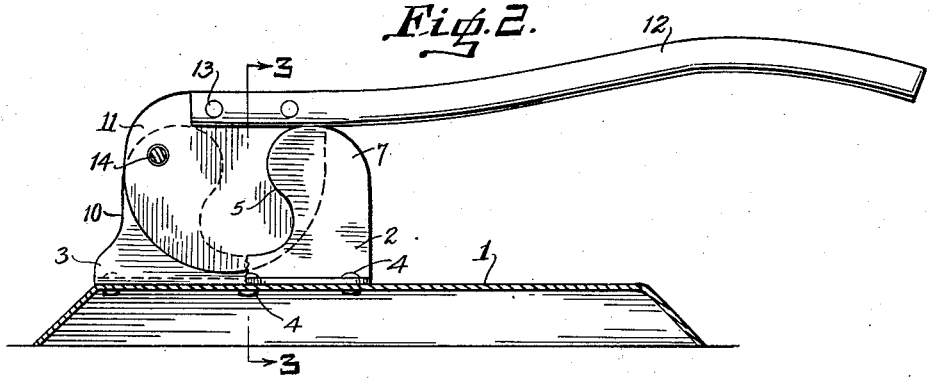
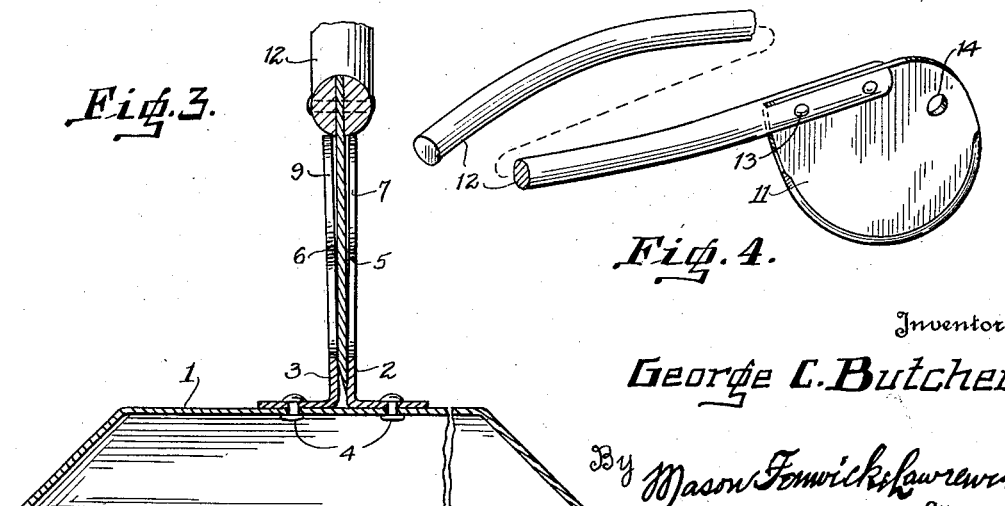
Inventor
George C. Butcher
By Mason Fenwick & Lawrence
Attorneys Patented Dec. 2, 1930

1,783,699

UNITED STATES PATENT OFFICE

GEORGE C. BUTCHER, OF PARKERSBURG, WEST VIRGINIA

POULTRY KILLER

Application filed April 22, 1929. Serial No. 357,265.

This invention relates to improvements in means for decapitating poultry, and for other similar purposes.

A prime object of this invention is to provide a convenient device for killing or decapitating poultry made from a minimum number of parts, and which will accomplish the purpose easily and quickly, the block and knife being formed in such a manner that the device is positive and sure in operation. In decapitators now commonly used, it has been found that a fowl occasionally liberates itself from the block by an upward movement of the head and neck, but owing to the construction of this invention, positive action is assured.

Other objects of the invention will appear from the following detailed description and as disclosed in the single sheet of drawings which is herewith made a part of this application.

In the drawings—

Figure 1 illustrates a perspective view of the device in operation.

Figure 2 represents a vertical sectional view of the poultry killer.

Figure 3 illustrates a sectional view of Figure 2 taken along line 3—3.

Figure 4 illustrates a perspective view of the knife or cutting member in assembled relationship with a handle.

As one embodiment of this invention, it is preferred that numeral 1 designate a main body portion or stand made of any suitable material, such as sheet metal, stamped into desired shape, and adapted to support thereon, preferably near one end, a suitably constructed block, comprising substantially members 2 and 3, consisting of metal plates bent into desired shape in order that they may be securely fastened by rivets 4, or otherwise, to the main body 1.

The plates 2 and 3 are located on the main body member 1 in such a manner that they are spaced apart a greater distance at the upper edges than at the lower edges, as clearly disclosed in Figure 3, so as to wedge against the knife blade 11, keeping the edge of the latter firmly against the face of the adjacent plate in the lower portion of the cut so as to certainly sever the skin at the lower side of the neck. The block, or plates 2 and 3, are formed having grooved portions 5 and 6 which register with each other, the upper portions of the grooves 5 and 6 being spaced apart a less distance than the lower portions, for the purpose of eliminating the possibility of the poultry working itself loose from the block just previous to decapitating. In order to properly form the grooves 5 and 6 above described, the plates 2 and 3 have upwardly extending sections 7, 8, 9 and 10, spaced apart for receiving therebetween a knife blade 11, which preferably is pivotally mounted at 14 in the upwardly extending sections 8 and 10 of the block. A handle member 12 is securely fastened to the blade 11 by means of rivets 13. A blade is pivoted between the plate members 2 and 3 in such a manner that it performs positively and surely its function.

This invention provides a poultry killer or decapitator of efficient construction, comprising a minimum number of parts, substantially consisting of a base plate 1, block members and a knife pivotally mounted therein, the block being formed so that the poultry may be quickly adjusted therein for decapitating by a single quick movement, and without appreciable exertion, the shape of the knife in cooperation with the groove in the block forming a very efficient device.

It will be understood that many changes and modifications may be made in the form of the embodiment of the invention within the scope of the following claims without departing from the spirit thereof.

What I claim is:

A device for decapitating poultry comprising a main body portion, a block including a pair of plates spaced apart and extending upwardly from the main body portion, said plates being formed with aligned recesses having restricted openings for receiving the neck of the poultry, a knife pivotally mounted between said plates and coacting with one plate to perform a shearing cut, the latter being mounted relative to said main body portion so as to converge slightly toward one another in the direction of said main body portion to wedgingly receive said knife as it descends and place it against the plate with which it coacts.

In testimony whereof I affix my signature.

GEORGE C. BUTCHER.